(12) United States Patent
Burwell et al.

(10) Patent No.: US 6,454,598 B1
(45) Date of Patent: Sep. 24, 2002

(54) IONOMER-INSULATED ELECTRICAL CONNECTORS

(75) Inventors: Douglas Neil Burwell, Georgetown; Sharon Elizabeth Macey, Toronto, both of (CA)

(73) Assignee: Shawcor Ltd., Rexdale (CA)

( * ) Notice: Subject to any disclaimer, the term of this patent is extended or adjusted under 35 U.S.C. 154(b) by 0 days.

(21) Appl. No.: 09/966,679

(22) Filed: Sep. 28, 2001

(30) Foreign Application Priority Data

Aug. 24, 2001 (CA) .............................................. 2355972

(51) Int. Cl.[7] .............................................. H01R 13/52
(52) U.S. Cl. .................... 439/523; 439/932; 29/859; 174/84 C; 174/88 R; 428/34.9
(58) Field of Search .................................. 439/523, 880, 439/881, 882, 877, 878, 932, 874; 174/84 C, DIG. 8, 73.1, 88 R; 29/859, 863; 428/34.9, 35.1

(56) References Cited

U.S. PATENT DOCUMENTS

| | | | |
|---|---|---|---|
| 3,264,272 A | 8/1966 | Rees | 428/36.9 |
| 3,816,335 A | 6/1974 | Evans | 252/408 |
| 4,118,596 A * | 10/1978 | Bassett et al. | 174/87 |
| 4,151,364 A | 4/1979 | Ellis | 174/84 C |
| 4,196,308 A | 4/1980 | Siden | 174/84 C |
| 4,383,131 A * | 5/1983 | Clabburn | 174/73 R |
| 4,431,861 A * | 2/1984 | Clabburn et al. | 174/73 R |
| 4,444,816 A | 4/1984 | Richards et al. | 428/36 |
| 4,993,149 A | 2/1991 | Zilligen et al. | 29/859 |
| RE33,591 E | 5/1991 | Feeny et al. | 156/85 |
| 5,070,597 A * | 12/1991 | Holt et al. | 29/631 |
| 5,278,354 A * | 1/1994 | Lhomme | 174/84 R |
| 5,418,331 A * | 5/1995 | Delalle | 174/87 |
| 5,514,836 A * | 5/1996 | Delalle et al. | 174/87 |
| 5,520,974 A * | 5/1996 | Chiotis et al. | 428/35.7 |
| 5,573,822 A | 11/1996 | Nishikawa et al. | 428/36.9 |
| 5,801,332 A * | 9/1998 | Berger et al. | 174/73.1 |
| 6,329,054 B1 * | 12/2001 | Rogestedt et al. | 428/378 |

OTHER PUBLICATIONS

Dupont, "Dupont Surlyn Product Information", 2001.
Dupont, "Dupont Surlyn Product Overview", 2001.

* cited by examiner

Primary Examiner—P. Austin Bradley
Assistant Examiner—Ross Gushi
(74) Attorney, Agent, or Firm—Woodling, Krost and Rust

(57) ABSTRACT

An electrical crimp connector comprises a metallic crimp barrel adapted to receive the bared end portion of an electrical conductor and a heat-shrinkable polymeric sleeve in which the crimp barrel is received. The insulating sleeve is comprised of an ionic polymer derived from the polymerization of an α-olefin and an ethylenically unsaturated carboxylic acid, a proportion of whose acid groups have been reacted to create ionic carboxylates of metal ions. The ionic polymer sleeve has high impact toughness, high abrasion and chemical resistance, high resistance to splitting by crimping tools, high degrees of flexibility and transparency, and a relatively low heat shrink temperature, making it more suitable for use in such connectors than sleeves comprised of other materials such as polyamides or polyolefins.

20 Claims, 3 Drawing Sheets

Shrink Profile at Fixed 2 Minute Intervals with Varying Temperatures

IONOMER-INSULATED ELECTRICAL CONNECTORS

FIELD OF THE INVENTION

The present invention relates to electrical connectors for insulated electrical conductors, and more specifically relates to crimp connectors of the type comprising a metallic crimp barrel and a heat-shrinkable sleeve.

BACKGROUND OF THE INVENTION

Crimp connectors are commonly used for establishing an electrical connection between the ends of two electrical conductors. A typical crimp connector comprises a malleable metallic crimp barrel surrounded by a heat-shrinkable sleeve, with a layer of heat-activated adhesive being applied to the inner surface of the sleeve. The bared end portions of two insulated conductors are inserted into the crimp barrel, which is then deformed by a crimping tool to establish an electrical connection between the two conductors. The sleeve is then heated, thereby activating the adhesive and shrinking the sleeve onto the crimp barrel and the conductors to seal the connection. The sleeve of the crimp connector is typically clear to allow visual confirmation that an electrical connection has been made, and is longer than the crimp barrel so as to completely cover the bared end portions of the conductors.

A typical crimp connector is described in U.S. Pat. No. 4,151,364 (Ellis), issued on Apr. 24, 1979. The crimp connector described in this patent comprises an insulating sleeve having a metal crimp barrel permanently positioned therein. This type of crimp connector is manufactured by inserting the crimp barrel into a heat-shrinkable sleeve in its expanded state and then partially shrinking the sleeve down onto the crimp barrel to permanently retain the crimp barrel in the sleeve. Since the sleeve and the crimp barrel are permanently attached, the crimping force must be applied to the crimp barrel through the heat-shrinkable sleeve. It is common to form the heat-shrinkable sleeves of such crimp connectors from a polyolefin which has been crosslinked by electron beam radiation. Sleeves made from this type of material generally have poor resistance to the forces applied by the crimping tool, resulting in splitting of the sleeve to expose the underlying conductors or reduction in the wall thickness of the tube to a point where it is insufficient to provide the necessary physical and dielectric strength.

One solution to this problem is proposed by U.S. Pat. No. 4,196,308 (Siden) issued on Apr. 1, 1980. The Siden patent provides a crimp connector comprising a metal crimp barrel which is removably retained within a heat-shrinkable sleeve. A connection between two conductors is formed by the following steps: the bared end portion of one conductor is inserted into the crimp barrel and the sleeve, the sleeve is slid back from the end of the conductor to expose the crimp barrel, the bared end portion of a second conductor is inserted into the opposite end of the crimp barrel, the exposed crimp barrel is crimped with a crimping tool, the heat-shrinkable sleeve is slid over the connection and is then heated to cause it to shrink over the connection. While the solution proposed by Siden overcomes the problem of splitting or otherwise damaging the heat-shrinkable sleeve, such connectors are more difficult to use since additional steps are required and the user must ensure that the sleeve is properly positioned over the connection prior to heat shrinking. Further, there is the possibility that the crimp barrel and sleeve can become separated and lost prior to use, resulting in further inconvenience.

A number of other solutions have been proposed to make the use of crimp connectors less problematic. One solution involves reduction of the strength of the crimping forces to avoid damage to the sleeve. However, this may result in a crimp connection of unacceptably low quality. Another solution involves shaping the crimping dies of the tool to evenly distribute the crimping forces throughout the wall of the tube. However, such crimping tools are frequently more expensive and consequently less likely to be purchased by a user.

Presently, the most preferred solution for overcoming this problem is to form the heat-shrinkable sleeve from a material which is more resistant to crimping forces than conventional crosslinked polyolefin sleeves. For example, U.S. Pat. No. 4,444,816 (Richards et al.) issued on Apr. 24, 1984, discloses radiation crosslinked polyamides comprising substantial amounts of Nylon-11 and/or Nylon-12 units. These polyamides are heat-shrinkable and are able to withstand the forces applied by a crimping tool without splitting or unacceptable reductions in wall thickness.

However, the use of polyamides to form heat-shrinkable sleeves in crimp connectors is not free from difficulties. These polymers have relatively high softening temperatures, typically about 150° C. Heating the electrical connection to these temperatures can damage the insulation of the conductors being joined or may result in excessive melting of the heat activated adhesive, causing it to run out of the connection. There is also the possibility that the user may not sufficiently heat the heat-shrinkable sleeve, resulting in poor sealing of the connection. Furthermore, crimp connectors formed with polyamide sleeves are typically more costly than those made with polyolefin sleeves, and may not have an acceptable degree of clarity which is desired in crimp connectors. Still further, polyamide polymers such as Nylon-11 and Nylon-12 tend to be very rigid, with the result that the metallic conductors may be prone to fatigue failure at the junction with the heat-shrinkable sleeve. It is preferable that the heat-shrinkable sleeve be as flexible as possible in order to provide strain relief to the conductors.

SUMMARY OF THE INVENTION

The disadvantages of the prior art discussed above are overcome by the present invention which provides a crimp connector comprising a crimp barrel and a heat-shrinkable sleeve which is formed from an ionic polymer.

Ionic polymers, also known as "ionomers", are based on copolymers of α-olefins with ethylenically unsaturated, preferably α,β-ethylenically unsaturated, carboxylic acid monomers in which a proportion of the acid groups of the copolymer are reacted with metal ions to create ionic carboxylates.

One of the earlier patents disclosing ionomers is U.S. Pat. No. 3,264,272 (Rees), issued Aug. 2, 1966. As noted in the Rees patent, ionomers have surprising properties which result from an ionic attraction between the metal ion and one or more ionized carboxylic acid groups. This ionic attraction results in a form of crosslinking which occurs in the solid state. However, when ionomers are heated above their melting point and subjected to shear stresses, the ionic crosslinks are ruptured and the polymers exhibit melt fabricability essentially the same as that of the uncrosslinked linear base copolymer.

It has also been found that ionomer resins have high impact toughness, abrasion resistance and chemical resistance, making them useful in a wide range of consumer and industrial products where these properties are important.

Some applications include automobile body parts, bowling pins and cut-resistant golf ball covers. However, ionomers are typically significantly less rigid than polyamide polymers.

The inventors have now found that heat-shrinkable tubing formed from ionomers has high resistance to splitting when subjected to forces of the type applied to a crimp connector by a crimping tool. The resistance to splitting possessed by ionomers is in fact similar to that of presently preferred polyamide heat-shrinkable sleeves.

Thus, the inventors appear to be the first to appreciate that ionomers are suitable for use in heat-shrinkable sleeves of crimp connectors. This is surprising since ionomers are known to be suitable for use in wire coatings (disclosed by Rees) and are known to be suitable for use in heat-shrinkable tubing, as disclosed in U.S. Pat. No. 3,816,335 (Evans) issued Jun. 11, 1974, and in U.S. Pat. No. 5,573,822 (Nishikawa et al) issued Nov. 12, 1996.

The failure of others to appreciate the suitability of ionomers as heat-shrinkable sleeves in crimp connectors is particularly surprising in view of the fact that ionomers are known to possess a number of other properties which are desirable in heat-shrinkable sleeves for crimp connectors, and which render them equally or more suitable to this application than polyamides. In particular, ionomers are known to possess a high degree of transparency; they accept colorants which do not materially deteriorate transparency, allowing for excellent color coding of products; they are typically less expensive than nylon; and can be made with varying degrees of stiffness. Another important advantage of ionomers is that they are heat-shrinkable at significantly lower temperatures than polyamide connector sleeves, typically about 50° C. lower. The lower heat shrink temperature renders ionomers more compatible with commonly used heat activated adhesives, such as ethylene-vinyl acetate-(EVA)-based hot melt adhesives, and lessens the likelihood of insufficient heating of the sleeve during heat shrinking and of deterioration of the wire coating due to excessive heating.

BRIEF DESCRIPTION OF THE DRAWINGS

The invention will now be described, by way of example only, with reference to the accompanying drawings, in which.

DETAILED DESCRIPTION OF PREFERRED EMBODIMENTS

Figure 1:
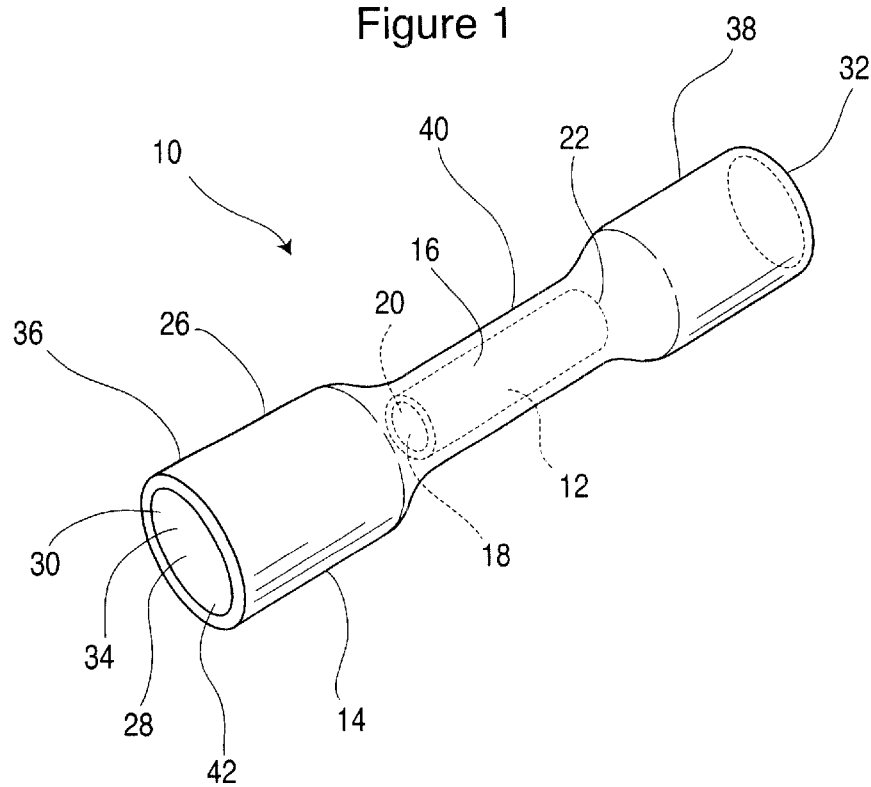
FIG. 1 is a perspective view of a crimp connector according to a first preferred embodiment of the present invention.

FIG. 1 illustrates a crimp connector 10 according to a first preferred embodiment of the present invention. Connector 10 is of the type commonly referred to as a "butt" connector since it is used to form an electrically conductive butt joint between the ends of two electrical conductors.

The butt connector 10 shown in FIG. 1 comprises a tubular metallic crimp barrel 12, and a heat-shrinkable polymeric sleeve 14.

Crimp barrel 12 has an outer surface 16, an inner surface 18 and first and second open ends 20 and 22. The inner surface 18 defines a hollow interior 24 extending through the crimp barrel 12 between the open ends 20 and 22. The crimp barrel 12 is preferably comprised of a metal which is a good conductor and which is sufficiently malleable such that barrel 12 is "crimpable", i.e. it can be deformed with a crimping tool. Preferred metals are selected from the group comprising copper, aluminum and brass, and alloys thereof.

The heat-shrinkable sleeve 14 is also of a generally cylindrical shape, having an outer surface 26, an inner surface 28 and first and second open ends 30 and 32. The inner surface 28 defines a hollow interior 34 of the sleeve 14 extending between its open ends 30 and 32.

Preferably, as shown in the drawings, the heat-shrinkable insulating sleeve comprises a hollow cylindrical tube having a length greater than a length of the crimp barrel 12, and is comprised of a pair of end portions 36 and 38, and a central portion 40 located therebetween. Central portion 40 has an inside diameter which is sized to receive the crimp barrel 12 in a sufficiently close-fitting relationship such that it is retained against substantial movement during normal use of the butt connector 10.

Each of the end portions 36 and 38 extends between the central portion 40 and a respective one of the open ends 30 and 32 of the sleeve 14. Preferably, the end portions 36 and 38 have an inside diameter greater than a diameter of the central portion 40, and form a gradual, sloped transition with the central portion 40. The diameter of the end portions 36 and 38 is enlarged relative to the central portion to allow the ends of the conductors to be easily inserted into the connector 10. The sloped transitions of the end portions 36 and 38 also assist in guiding the ends of the conductors into the crimp barrel 12.

Although the preferred connector shown in the drawings comprises a central portion 40 which closely receives the crimp barrel 12 and has flared, enlarged end portions 36 and 38, it will be appreciated that this configuration is not an essential feature of the invention. Rather, the insulating sleeve 14 may be of constant diameter, with the crimp barrel 12 being loosely held within the hollow interior 34 of the sleeve 14.

The heat-shrinkable insulating sleeve according to the invention preferably has an adhesive layer 42 formed on the inner surface 28 thereof, with the adhesive layer preferably being formed inside sleeve 14 by melt co-extrusion. The adhesive resin composition is preferably a conventional hot-melt adhesive composition which melts and flows at temperatures required for heat shrinking of the sleeve. Some examples of hot-melt adhesives which can be employed in the connector of the present invention include thermoplastic polyamide resins, thermoplastic saturated copolyester resins, and resin compositions comprising such hot-melt adhesives as copolymers of ethylene, ethyl acrylate, and carbon monoxide. The most preferred hot-melt adhesives are resin compositions based on copolymers of ethylene and vinyl acetate, or those based on polyamide polyers.

The connector 10 is formed by first inserting the crimp barrel 12 into sleeve 14, it being understood that sleeve 14 is of constant cross-sectional radial diameter prior to assembly. The crimp barrel 12 is positioned inside sleeve 14 so that it is located centrally relative to the two open ends 30 and 32. The central portion 40 of sleeve 14 is then heated, causing recovery in central portion 40, i.e. shrinkage of sleeve 14 into contact with the outer surface 16 of the crimp barrel 12. A suitable process for forming the connector, and heat shrinking the central portion 40, is described in U.S. Pat. No. Re.33,591 (Feeny et al.), reissued on May 21, 1991, which is incorporated herein by reference in its entirety. During recovery of the central portion 40 of sleeve 14, the end portions 36 and 38 remain unrecovered, i.e. they remain in their expanded state.

The heat-shrinkable insulating sleeve 14 according to the invention is contains at least one ionic polymer, also referred to herein as an "ionomer". Preferably, the ionomer content of sleeve 14 is sufficient to impart to the sleeve 14 the above-mentioned desirable properties of ionomers, i.e. high impact toughness, high abrasion and chemical resistance, high resistance to splitting by crimping tools, high degrees of flexibility and transparency, and heat shrinkability at lower temperatures than polyamides. Preferably, the sleeve 14 is primarily comprised of ionic polymer, and optionally contains other polymers in lesser amounts than the ionic polymer. More preferably, the ionomer content of sleeve 14 is greater than 50% by weight, even more preferably greater than 80% by weight, and most preferably greater than 90% by weight. For example, where colorants are employed, the ionomer is preferably prepared as a color masterbatch containing an EVA carrier. Other optional ingredients include to be used in minor quantities include EVA, metallocene polyethylene, etc. to prevent premature shrinking.

In some preferred embodiments of the present invention, the heat-shrinkable sleeve may be comprised of a plurality of co-axially arranged polymeric layers and is formed, for example, by co-extrusion of two or more different polymers. Where the sleeve 14 comprises a plurality of layers, at least one of the layers will be primarily comprised of an ionic polymer as described above.

Ionomers suitable for use in the present invention are derived from the polymerization of at least one $\alpha$-olefin and at least one ethylenically unsaturated carboxylic acid, a proportion of whose acid groups have been reacted to create ionic carboxylates of metal ions. Preferred ionomers for use in the heat-shrinkable sleeves of electrical connectors according to the invention include those defined in the above-mentioned Rees patent, which is incorporated herein by reference in its entirety.

The $\alpha$-olefins incorporated in the ionomers of the present invention have the general formula $RCH=CH_2$, wherein R is a radical selected from the group comprising hydrogen and alkyl radicals having from 1 to 8 carbon atoms. Preferred $\alpha$-olefins for use in the ionomers according to the invention include ethylene, propylene, 1-butene, 1-pentene, 1-hexene, 1-heptene, 3-methyl-1-butene and 4-methyl-1-pentene. Preferably, the $\alpha$-olefin content of the ionomer is greater than or equal to 50 mol percent based on the ionomer, and is more preferably greater than or equal to about 80 mol percent.

The ethylenically unsaturated carboxylic acid component of the ionomer preferably comprises one or more $\alpha,\beta$-ethylenically unsaturated carboxylic acids, which are selected from the group comprising $\alpha,\beta$-ethylenically unsaturated monocarboxylic and dicarboxylic acids having from 3 to 8 carbon atoms. Preferred examples of such carboxylic acids include acrylic acid, methacrylic acid, monoesters of dicarboxylic acids such as methyl hydrogen maleate, methyl hydrogen fumarate, ethyl hydrogen fumarate, maleic acid and maleic anhydride. The amount of unsaturated carboxylic acid in the ionomer is preferably from about 0.2 to 25 mol percent based on the ionomer, and more preferably from about 1 to about 10 mol percent.

The base copolymer employed in forming the ionomers of the present invention may be prepared in several ways, including copolymerization of a mixture of the olefin and the acid monomers, and grafting the acid monomer to a base polymer of the olefin. However, direct copolymerization of the olefin and the acid component is preferred as it ensures that the carboxylic acid groups are randomly distributed over all the molecules comprising the ionic copolymer.

The most preferred base copolymers are those obtained by direct copolymerization of ethylene with an $\alpha,\beta$-ethylenically unsaturated monocarboxylic acid comonomer, which is most preferably selected from the group comprising acrylic acid and methacrylic acid.

The ionic base copolymer has a molecular weight, as defined by melt flow index, which is preferably in the range of from about 0.1 to about 1,000 g/10 min., and more preferably in the range of from about 1.0 to about 100 g/10 min.

Although the preferred base copolymers used in forming the ionomers according to the invention comprise the above-described olefin and acid monomers, the base copolymer may also contain additional components. For example, additional copolymerizable monoethylenically unsaturated monomers can be employed in combination with the olefin and the acid monomer described above.

The ionomers of the present invention are obtained by reacting (also referred to herein as "neutralizing") a proportion of the acid groups of the base copolymer with an ionizable metal compound. The metal ions which are useful in the ionomers of the present invention include mono-, di- and trivalent ions of metals in Groups I, II, III, IV-A and VIII of the Periodic Table of Elements. Preferred examples of monovalent metal ions include $Na^+$, $K^+$, $Li^+$, $Cs^+$, $Ag^+$, $Hg^+$ and $Cu^+$. Preferred divalent metal ions include $Be^{2+}$, $Mg^{2+}$, $Ca^{2+}$, $Sr^{2+}$, $Ba^{2+}$, $Cu^{2+}$, $Cd^{2+}$, $Hg^{2+}$, $Sn^{2+}$, $Pb^{2+}$, $Fe^{2+}$, $Co^{2+}$, $Ni^{2+}$ and $Zn^{2+}$. Preferred trivalent metal ions include $Al^{3+}$, $Sc^{3+}$, $Fe^{3+}$ and $Y^{3+}$. The most preferred monovalent metal ions are alkali metals, more preferably selected from the group comprising $Na^+$, $K^+$ and $Li^+$. The most preferred divalent metal ion is $Zn^{2+}$. It is not essential that only one metal ion be employed in the ionomers of the invention, and more than one metal ion may be preferred in certain applications.

The degree of neutralization is preferably such that the metal ion neutralizes at least 10% of the carboxylic acid groups of the base copolymer. More preferably, it is desirable to neutralize from about 50% to about 90% of the acid groups.

After formation of the ionomer as described above, the ionomer resin composition is shaped into a tube using a melt extruder or the like. The tube is then preferably covalently crosslinked by any conventional method, for example irradiation with an ionizing radiation such electron beams, gamma-rays and X-rays, or by heating.

In embodiments where crosslinking is conducted by ionizing radiation, a crosslinking accelerator is preferably incorporated into the ionomer resin and a crosslinking inhibitor is preferably incorporated into the adhesive layer.

The method for producing the heat-shrinkable insulating sleeve according to the present is not particularly limited. For example, the ionomer resin composition may preferably be shaped into a tube using a melt extruder or the like. The tube is then crosslinked as described above, and the diameter of the crosslinked tube is expanded under high temperature conditions by, for example, introducing compressed air into the tube. The tube is then fixed in its expanded shape by cooling.

Particularly preferred ionomer resins for use in the connectors of the present invention are sold by DuPont under the trademark Surlyn®. A number of different grades of Surlyn® ionomer resins are commercially available. All are based on ethylene/methacrylic acid copolymers, with Surlyn® 7930 and 7940 containing lithium ions; Surlyn® 8020, 8120, 8140, 8150, 8320, 8527, 8660, 8670, 8920, 8940, 8945, PC350 and PC100 containing sodium ions; and Surlyn® 9020,9120,9150,9320W, 9520, 9650, 9720, 9721, 9730, 9910, 9945, 9950 and 9970 containing zinc ions.

Surlyn® ionomer resins generally have a melt flow index of from about 0.7 to 20, a density of about 0.94 to about 0.97, and a melting point of from about 70° C. to about 100° C. Preferred for use in the connectors of the present invention are those Surlyn® ionomer resins which have a melting point above about 80° C. and which have high impact toughness. Among the most preferred Surlyn® ionomer resins is Surlyn® 8940, commonly used as a ski laminating film, which has a Notched Izod impact strength of 1025 Jm and a melting point of 94° C. as determined by differential scanning calorimetry (DSC).

As mentioned above, the melting temperatures, and consequently the expansion and heat shrink temperatures, of preferred ionomer resins such as Surlyn® ionomer resins are significantly lower than those of polyamides commonly used for heat-shrinkable connector sleeves. This is advantageous for a number of reasons. Firstly, a lower expansion temperature makes the manufacture of heat-shrinkable sleeves less expensive in terms of equipment and energy costs. A lower heat shrink temperature lessens the likelihood that insufficient heat will be applied by the user and allows the ionomer sleeve to be heated to its heat shrink temperature more quickly than a conventional polyamide sleeve. Furthermore, there is less chance that damage (eg. by creeping, melting or cracking) will be caused to the insulating layer of the conductors being joined, which are typically comprised of polyethylene or poly(vinyl chloride), and less chance that the heat-activated adhesive will melt and run out of the connection during heat shrinking. Ionomer resins also tend to have better transparency than polyamide resins, more readily accept colourants which do not deteriorate transparency, are considerably less expensive, are less sensitive to alcohols and moisture than polyamides, are easier to crosslink, and can be made to have varying degrees of stiffness which is not possible with resins containing a large proportion of nylon.

A preferred method for forming a sealed connection between a pair of conductors using the butt connector 10 according to the first preferred embodiment of the present invention is now described below with reference to FIGS. 2 to 4. In the method described below, an electrical connection is formed between a pair of electrical conductors 44. As both conductors 44 are identical, the same reference numerals are used to describe the components thereof. Each conductor 44 comprises an electrical wire 46, typically comprised of copper, surrounded by an insulating layer 48 which is typically comprised of a polymeric material such as poly (vinylchloride) or polyethylene. As shown, the ends of the conductors 44 are stripped prior to connection to form bared end portions 50.

Figure 2:
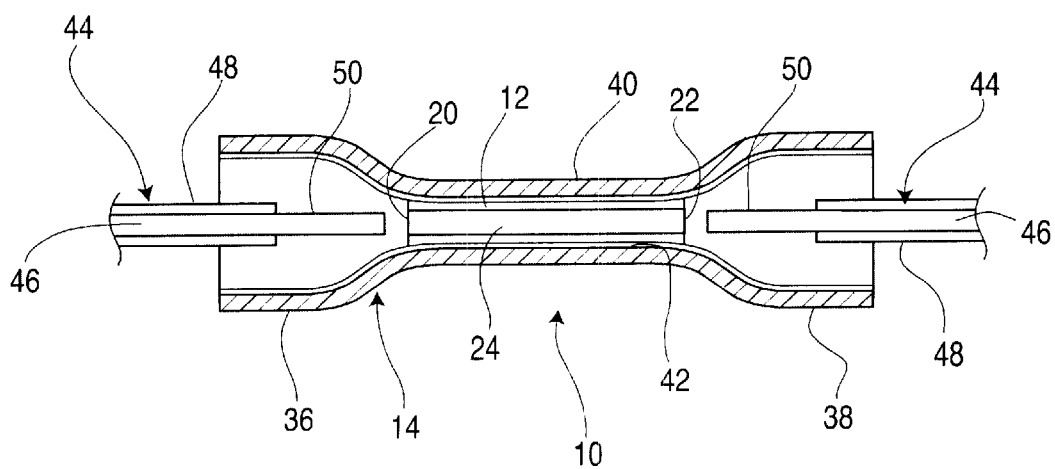
FIGS. 2 to 4 are longitudinal cross-sectional views of the crimp connector of FIG. 1, illustrating the steps involved in forming a connection between the ends of two conductors.

In FIG. 2, the bared end portions 50 of conductors 44 have been inserted into the enlarged end portions 36 and 38 of sleeve 14 and are about to be inserted into the open ends 20 and 22 of the crimp barrel 12. As shown, the open ends 20 and 22 and the hollow interior 24 of crimp barrel 12 are sized and shaped to closely receive the bared end portions 50, and the diameter of insulating layer 48 is greater than the inside diameter of crimp barrel 12 to prevent the insulated portions of conductors 44 from entering the crimp barrel 12.

Figure 3:
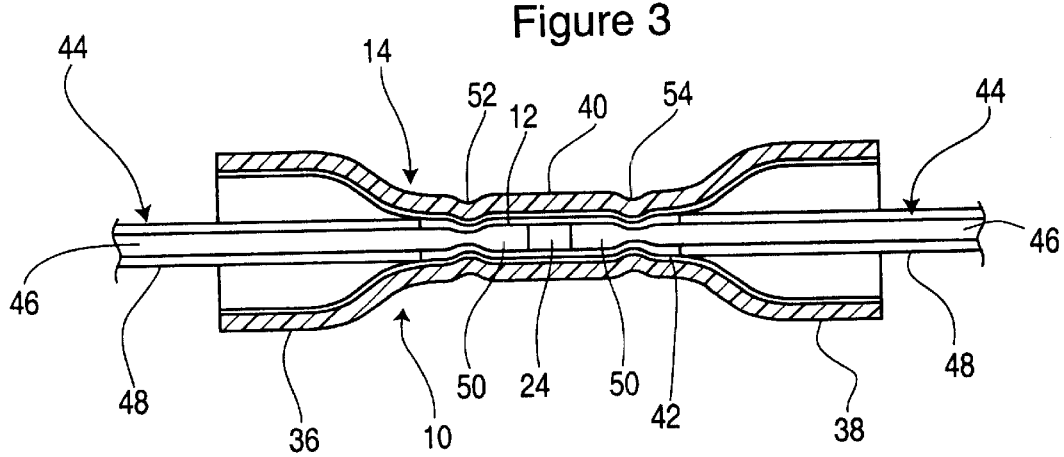
Figure 4:
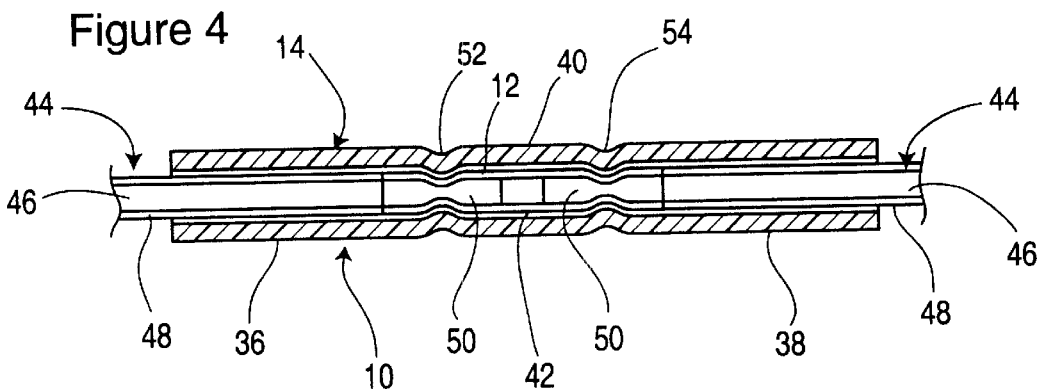

Referring now to FIG. 3, the bared end portions 50 of conductors 44 have been received in the open ends 20 and 22 of the crimp barrel 12 so that the end of the insulating layer directly abuts the ends 20 and 22 of crimp barrel 12, and so that a portion of the insulating layer is received inside the end portions 36 and 38 of sleeve 14. In this position, the bared end portions 50 extend inwardly into the crimp barrel 12 by a distance which is slightly less than half the length of the crimp barrel 12. However, it will be appreciated that the length of bared end portions 50 may vary to some extent. The bared end portions 50 may be somewhat shortened so long as they extend into the crimp barrel 12 to a sufficient extent that they can be crimped. The bared end portions may instead be longer than one half of the length of the crimp barrel 12 in which case the end of the insulating layer 48 would not abut the ends 20 or 22 of the crimp barrel 12. However, the insulating layer 48 should extend somewhat into the end portions 36 and 38 of the sleeve 14, such that a seal can be formed between the sleeve 14 and the insulating layer 48, as described below. Furthermore, the crimp barrel 12 may preferably be provided with a centrally located septum to prevent over-insertion of the bared end portions 50 into the crimp barrel 12.

Once the bared end portions 50 are received inside crimp barrel 12 as shown in FIG. 3, the central portion 40 of sleeve 14, the adhesive layer 42 contained therein, the crimp barrel 12 and bared end portions 50 are all subjected to a crimping operation using a conventional crimping tool. This operation results in crimps 52 and 54 being formed for each of the bared end portions 50, thereby creating electrical contact between the crimp barrel 12 and the bared end portions 50, and also retaining the conductors against movement relative to the crimp barrel 12. It will be appreciated that the crimps formed by various crimping tools may vary. Rather than forming a pair of crimps 52 and 54 as illustrated in the drawings, the crimping tool may instead form one centrally located crimp extending over parts of both end portions 50.

The end portions 36 and 38 of sleeve 14 are then heated, causing recovery of the end portions 36 and 38 into an engaging relationship with the insulating layer 48, and also activating the adhesive layer 42, causing it to flow and seal the connection between the sleeve and the conductors 44. This seal prevents penetration of moisture into the connection and also prevents relative movement of the conductors 44. The completed electrical connection is shown in FIG. 4.

Figure 5:
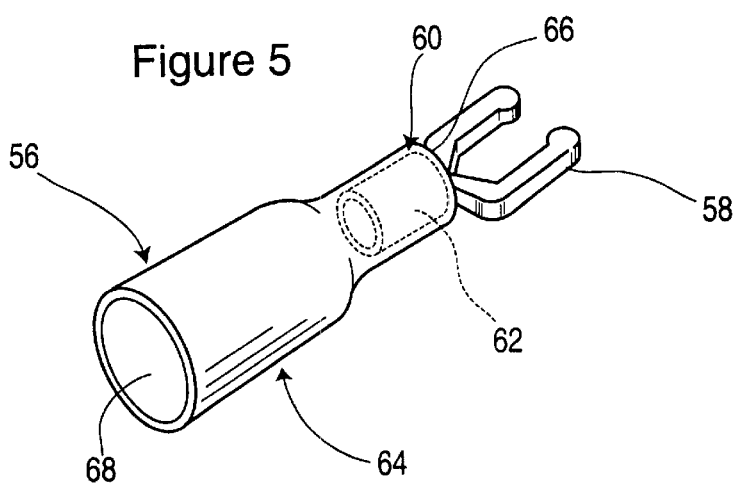
FIG. 5 is a perspective view of a crimp connector according to a second preferred embodiment of the present invention.

FIG. 5 illustrates an electrical connector according to a second preferred embodiment of the present invention, which comprises a terminal connector 56 having an exposed terminal fastener 58 for forming an electrical connection with a screw terminal or the like. Although the exposed terminal fastener 58 is shown as having a U-shape, it may instead have another suitable shape for use with such terminals, such as an annular shape.

The structure and composition of terminal connection 56 is similar to that described above in connection with the butt connector 10 according to the first preferred embodiment of the invention, and is now briefly described below.

The terminal fastener 58 is formed at one end of a conductive member 60, the other end of which comprises a crimpable, tubular metallic crimp barrel 62 with an open end for receiving the bared end portion of an electrical conductor (not shown). The metal from which the conductive member 60 is formed is preferably the same as that described above for crimp barrel 12.

Terminal fastener 56 also includes a heat-shrinkable polymeric sleeve 64 which is longer than the crimp barrel 62, sleeve 64 having a first end 66 and a second end 68. The crimp barrel 62 is received inside the first end 66 of sleeve 64 in a sufficiently close-fitting relationship so as to retain the position of the crimp barrel 62 within the sleeve 64 during normal use. The second end 68 of sleeve 64 extends past the open end of the crimp barrel 62 and is sized to receive an insulated portion of the electrical conductor. As in connector 10, first end 66 of sleeve 64 is recovered by heat shrinking so as to closely receive the crimp barrel 62, and the second end 68 is of larger diameter to assist in inserting the lead of the electrical conductor. The insulating sleeve 64 is primarily comprised of an ionomer having the composition and characteristics described above with reference to the first preferred embodiment, or may preferably be formed of a plurality of layers, at least one of which is primarily comprised of ionomer, as described above.

The advantages of the present invention are further illustrated by the following examples.

EXAMPLE 1

Crimp Tests

A number of crimp connectors of various diameters were prepared by inserting metal crimp barrels into sleeves comprised of heat-shrinkable tubing, followed by sufficient heating of the sleeve to shrink the sleeve over the crimp barrel. Crimp connectors were prepared using sleeves comprised of the following materials:

1. Standard polyolefin

Commercial name: MDKT

Manufacture location: Mechenheim, Germany

Manufacturer: DSG Canusa

Composition: MDPE, masterbatch colourant

2. Ionomer

Commercial name: NiAC (proposed)

Manufacture location: Toronto, Canada

Manufacturer: DSG Canusa

Composition: Dupont Surlyn® 8940, masterbatch

3. Polyamide (identified herein as "Nylon")

Manufacturer: Raychem, division of Tyco Electronics

Composition: Nylon, grade and composition unkown

The connectors were each crimped by a standard crimping tool. It was observed that the sleeves of all the polyolefin connectors fractured upon crimping. In contrast, the ionomer and polyamide connectors performed equivalently as no fracture of the sleeves was observed.

EXAMPLE 2

Heat Shrink Time and Temperature

Figure 6:
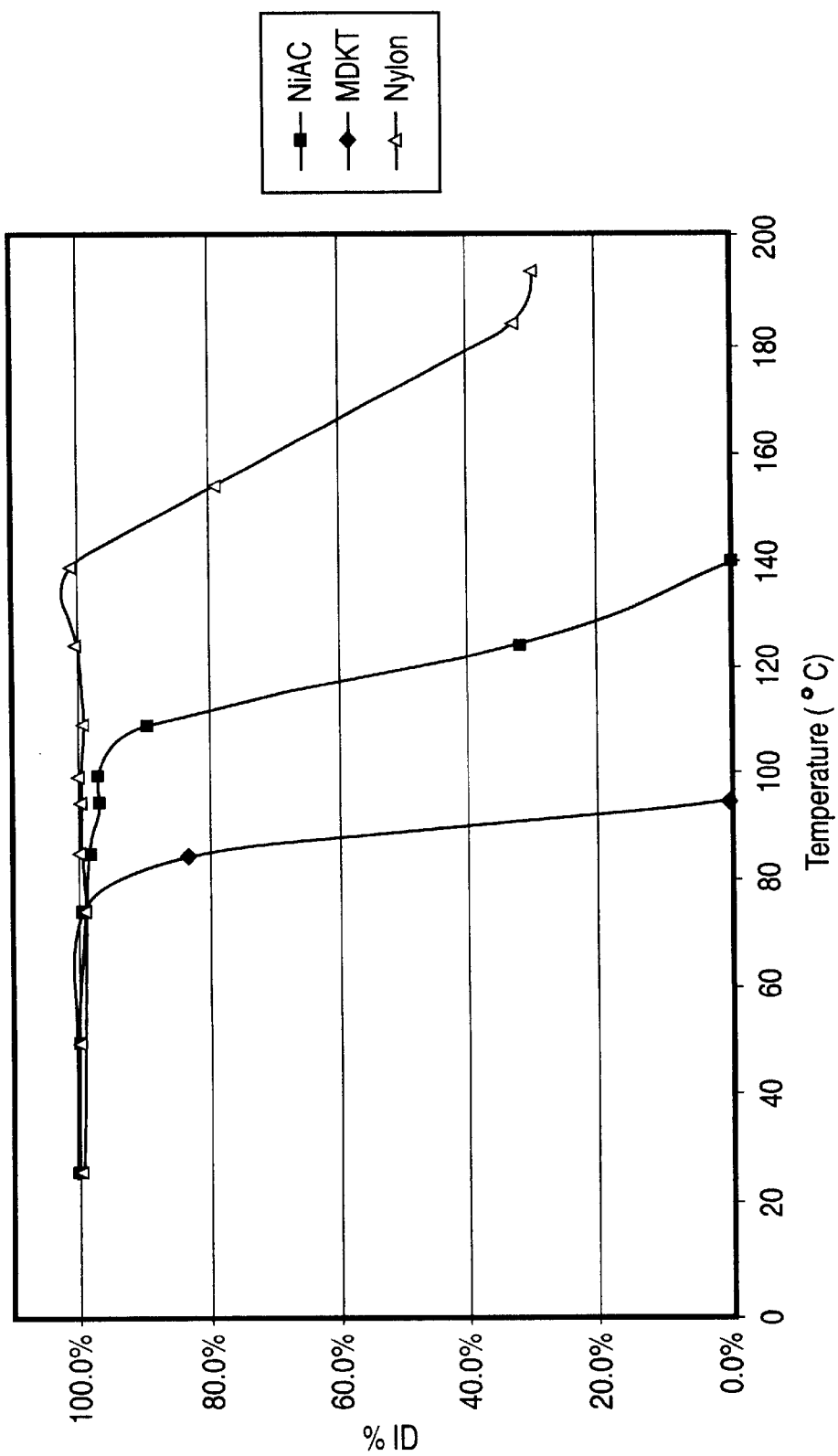
FIG. 6 is a graph which compares the degree of shrinkage against temperature. for ionomer tubing, polyolefin tubing and polyamide tubing.

As shrink time and temperature are related, the standard industry test is to fix the time and measure the percent recovery of the tubing. The percent recovery is typically expressed as percentage of inside diameter (ID) of the tubing in its expanded state. FIG. 6 is a plot of percent recovery vs. temperature for each type of heat-shrinkable sleeve of Example 1. The data shown in FIG. 6 was obtained by measuring the inside diameter of the tubing at two minute intervals while the tubing was heated at a constant rate.

As can be seen from FIG. 6, the ionomer (NiAC) sleeve attained full recovery between 90 and 100°C., which was considerably less than the temperatures required for full recovery of the MDKT and Nylon sleeves. In fact, the Nylon sleeve only started to shrink at relatively high temperatures of about 150° C.

EXAMPLE 3

Product Clarity

In this example, the clarity of the tubing used in the connectors of Example 1 was observed. The NiAC product was observed to have better clarity and surface finish than either the MDKT or Nylon tubing.

Although the invention has been described in connection with certain preferred embodiments, it is not limited thereto. Rather, it is intended that the invention include all embodiments which may be within the scope of the following claims.

What is claimed is:

1. An electrical connector for connecting two or more electrical conductors, comprising:

a crimpable, tubular metallic crimp barrel open at both ends to receive bared end portions of the electrical conductors to be connected, and to create electrical contact with and retain said electrical conductors after crimping; and a heat-shrinkable polymeric sleeve inside which said crimp barrel is received in a sufficiently close-fitting relationship so as to retain a position of said crimp barrel within said sleeve, said sleeve being longer than said crimp barrel and having ends which extend beyond the ends of the crimp barrel to receive insulated portions of the conductors to be connected;

wherein the heat-shrinkable sleeve is comprised of one or more layers, at least one said layer being primarily comprised of an ionic polymer, said ionic polymer being derived from the polymerization of at least one α-olefin and at least one ethylenically unsaturated carboxylic acid, a proportion of whose acid groups have been reacted to create ionic carboxylates of metal ions.

2. The electrical connector of claim 1, wherein a portion of said heat-shrinkable sleeve has been recovered into a close-fitting relationship with said barrel, and wherein the ends of the sleeve extending beyond the ends of the crimp barrel remain unrecovered.

3. The electrical connector of claim 1, wherein said at least one layer of the heat-shrinkable sleeve which is primarily comprised of the ionic polymer comprises at least 50% by weight of the ionic polymer.

4. The electrical connector of claim 1, wherein said at least one layer of the heat-shrinkable sleeve which is primarily comprised of the ionic polymer comprises at least 80% by weight of the ionic polymer.

5. The electrical connector of claim 1, wherein said at least one layer of the heat-shrinkable sleeve which is primarily comprised of the ionic polymer comprises at least 90% by weight of the ionic polymer.

6. The electrical connector of claim 1, wherein said heat-shrinkable sleeve is lined with a hot melt adhesive which melts and flows at a temperature required to shrink said sleeve.

7. The electrical connector of claim 6, wherein the hot melt adhesive is based on a copolymer of ethylene and vinyl acetate.

8. The electrical connector of claim 6, wherein the hot melt adhesive is based on a polyamide polymer.

9. The electrical connector of claim 1, wherein the heat-shrinkable sleeve comprises a hollow cylindrical tube.

10. The electrical connector of claim 1, wherein said α-olefin comprises ethylene.

11. The electrical connector of claim 1, wherein said ethylenically unsaturated carboxylic acid is an α,β-ethylenically unsaturated carboxylic acid.

12. The electrical connector of claim 11, wherein said α,β-ethylenically unsaturated carboxylic acid is selected from the group comprising α,β-ethylenically unsaturated monocarboxylic and dicarboxylic acids having from 3 to 8 carbon atoms.

13. The electrical connector of claim 12, wherein said α,β-ethylenically unsaturated carboxylic acid is selected from the group comprising acrylic acid and methacrylic acid.

14. The electrical connector of claim 1, wherein said metal ions are selected from one or more members of the group comprising sodium, lithium and zinc ions.

15. The electrical connector of claim 14, wherein said metal ions are sodium ions.

16. The electrical connector of claim 1, wherein the heat-shrinkable insulating sleeve is covalently crosslinked prior to expansion.

17. The electrical connector of claim 16, wherein the heat-shrinkable insulating sleeve is covalently crosslinked by irradiation with an ionizing radiation.

18. An electrical connector for forming a terminal connection with an electrical conductor, comprising:

a conductive member, one end of which comprises a crimpable, tubular metallic crimp barrel open to receive a bared end portion of the electrical conductor and another end of which comprises a terminal fastener;

a heat-shrinkable polymeric sleeve inside which said crimp barrel is received in a sufficiently close-fitting relationship so as to retain a position of said crimp-barrel within said sleeve, said sleeve being longer than said crimp barrel and having one of its ends extending past the open end of the conductive member to receive an insulated portion of the conductor while leaving the terminal fastener exposed;

wherein the heat-shrinkable sleeve is comprised of one or more layers, at least one said layer being primarily comprised of an ionic polymer, said ionic polymer being derived from the polymerization of at least one α-olefin and at least one ethylenically unsaturated carboxylic acid, a proportion of whose acid groups have been reacted to create ionic carboxylates of metal ions.

19. The electrical connector of claim 18, wherein the ethylenically unsaturated carboxylic acid comprises an α,β-ethylenically unsaturated carboxylic acid.

20. The electrical connector of claim 18, further comprising an adhesive layer provided on the inner surface of the heat-shrinkable sleeve.

* * * * *